United States Patent
Singer et al.

(10) Patent No.: US 9,327,681 B2
(45) Date of Patent: May 3, 2016

(54) BELT RETRACTOR WITH TWO FORCE-LIMITING DEVICES ACTING IN PARALLEL

(71) Applicant: Autoliv Develpement AB, Vargarda (SE)

(72) Inventors: Klaus-Peter Singer, Hamburg (DE); Ronald Jabusch, Elmshorn (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 55 days.

(21) Appl. No.: 14/359,496

(22) PCT Filed: Nov. 7, 2012

(86) PCT No.: PCT/EP2012/004626
§ 371 (c)(1),
(2) Date: May 20, 2014

(87) PCT Pub. No.: WO2013/079150
PCT Pub. Date: Jun. 6, 2013

(65) Prior Publication Data
US 2015/0083841 A1    Mar. 26, 2015

(30) Foreign Application Priority Data
Nov. 30, 2011 (DE) .......................... 10 2011 087 413

(51) Int. Cl.
*B60R 22/38* (2006.01)
*B60R 22/34* (2006.01)
*B60R 22/28* (2006.01)

(52) U.S. Cl.
CPC ....... *B60R 22/3413* (2013.01); *B60R 2022/286* (2013.01); *B60R 2022/287* (2013.01)

(58) Field of Classification Search
CPC ...................... B60R 22/3413; B60R 2022/286
USPC ....................................................... 242/379.1
See application file for complete search history.

(56) References Cited

U.S. PATENT DOCUMENTS 3,952,967 A   4/1976  Barile et al.
4,206,887 A   6/1980  de Rosa
(Continued)

FOREIGN PATENT DOCUMENTS

DE    296 14 587 U1    2/1997
DE    201 10 423 U1    11/2001
(Continued)

OTHER PUBLICATIONS

PCT International Search Report—Jan. 31, 2013.
(Continued)

*Primary Examiner* — Sang Kim
(74) *Attorney, Agent, or Firm* — Brinks Gilson & Lione

(57) ABSTRACT

A seat belt retractor including a belt shaft rotatably supported in a frame and two force-limiting devices acting in parallel. The first and the second part of the belt shaft axially overlap forming an annular space. The second force-limiting device is a band element abutting a radial outer wall of the annular space with a first section, and on the radial inner wall with a second section and is deflected in a deflection fitting between the first and the second sections (20, 21, 29, 30). During relative movement between the first and second parts, the band element can be unwound or wound up from the outer wall onto the inner wall or vice versa in an energy-dissipating manner.

18 Claims, 16 Drawing Sheets

(56) References Cited

U.S. PATENT DOCUMENTS

| | | | |
|---|---|---|---|
| 4,323,205 A | 4/1982 | Tsuge et al. | |
| 4,483,494 A | 11/1984 | Takada | |
| 4,749,142 A | 6/1988 | Saitow | |
| 4,943,011 A | 7/1990 | Kitamura et al. | |
| 5,297,752 A | 3/1994 | Brown et al. | |
| 5,601,251 A | 2/1997 | Hishon et al. | |
| 5,636,806 A | 6/1997 | Sayles | |
| 5,769,345 A | 6/1998 | Morner et al. | |
| 5,913,538 A * | 6/1999 | Herpich | 280/805 |
| 6,098,772 A | 8/2000 | Kimmig et al. | |
| 6,260,782 B1 | 7/2001 | Smithson et al. | |
| 6,409,115 B1 | 6/2002 | Specht et al. | |
| 6,443,382 B1 | 9/2002 | Bae | |
| 6,454,201 B1 | 9/2002 | Strobel et al. | |
| 6,616,081 B1 | 9/2003 | Clute et al. | |
| 6,871,813 B2 | 3/2005 | Bae | |
| 6,932,324 B2 | 8/2005 | Biller et al. | |
| 7,152,824 B2 * | 12/2006 | Shiotani et al. | 242/379.1 |
| 7,210,645 B2 | 5/2007 | Paterson et al. | |
| 7,392,957 B2 | 7/2008 | Hiramatsu | |
| 7,631,830 B2 | 12/2009 | Boelstler et al. | |
| 7,980,503 B2 | 7/2011 | Saito et al. | |
| 8,083,262 B2 * | 12/2011 | Hiramatsu et al. | 280/807 |
| 8,529,398 B2 | 9/2013 | Jabusch | |
| 2002/0050542 A1 | 5/2002 | Nagata et al. | |
| 2002/0190515 A1 | 12/2002 | Birk et al. | |
| 2003/0201357 A1 | 10/2003 | Koning et al. | |
| 2004/0206844 A1 | 10/2004 | Shiotani et al. | |
| 2005/0059524 A1 | 3/2005 | Hori et al. | |
| 2005/0133330 A1 | 6/2005 | Stiefvater | |
| 2006/0208126 A1 | 9/2006 | Hiramatsu | |
| 2008/0105778 A1 | 5/2008 | Benner | |
| 2008/0191083 A1 | 8/2008 | Sumiyashiki | |
| 2010/0117437 A1 * | 5/2010 | Hiramatsu et al. | 297/472 |

FOREIGN PATENT DOCUMENTS

| | | |
|---|---|---|
| DE | 20207276 U1 | 9/2002 |
| DE | 10 2005 016 822 B3 | 1/2007 |
| DE | 10 2008 010 431 A1 | 9/2009 |
| DE | 10 2008 049 931 A1 | 5/2010 |
| DE | 10 2009 010 435 A1 | 9/2010 |
| EP | 1 069 009 A1 | 1/2001 |
| FR | 2528928 A1 | 12/1983 |
| JP | 10297426 A | 11/1998 |
| JP | 2003019945 A | 1/2003 |
| JP | 2004276742 A | 10/2004 |
| JP | 2007331563 A | 12/2007 |
| WO | WO 96/32303 | 10/1996 |
| WO | 03/020557 A1 | 3/2003 |
| WO | 2004/096611 A1 | 11/2004 |
| WO | 2006/108451 A1 | 10/2006 |
| WO | 2007/130041 A1 | 11/2007 |
| WO | 2010/037460 A2 | 4/2010 |
| WO | 2010/139433 A1 | 12/2010 |

OTHER PUBLICATIONS

German Examination Report—Jun. 19, 2012.

* cited by examiner

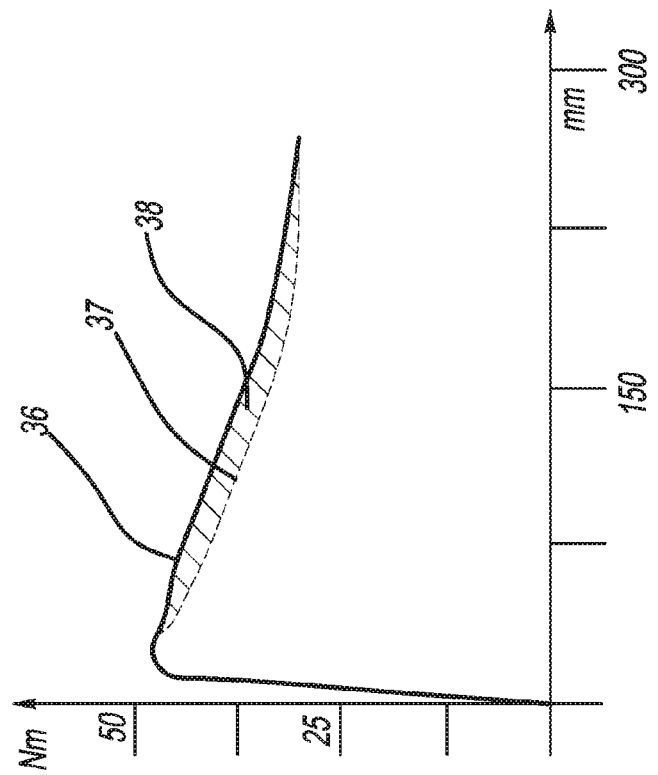
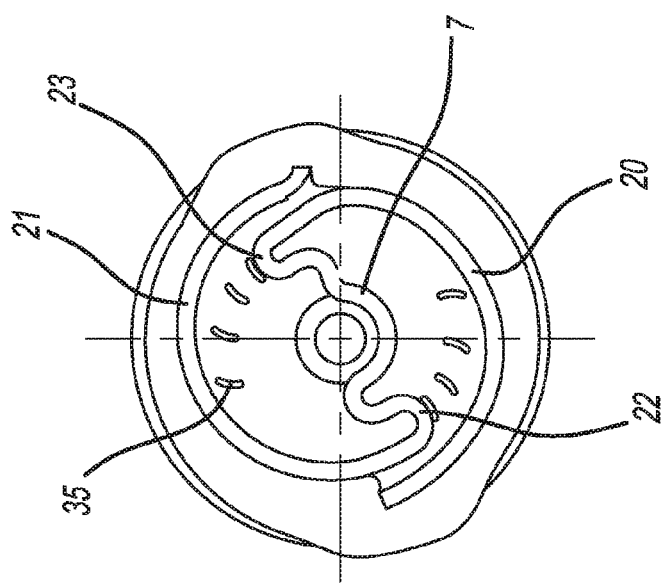
FIG. 11b
FIG. 11a

BELT RETRACTOR WITH TWO FORCE-LIMITING DEVICES ACTING IN PARALLEL

CROSS-REFERENCE TO RELATED APPLICATIONS

This application claims priority to German Patent Application No. 10 2011 087 413.5, filed Nov. 30, 2011 and PCT/EP2012/004626, filed Nov. 7, 2012.

STATEMENT REGARDING FEDERALLY SPONSORED RESEARCH OR DEVELOPMENT

Not Applicable

THE NAMES OF THE PARTIES OF A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OF A JOINT INVENTOR

Not Applicable

BACKGROUND OF THE INVENTION (1) Field of the Invention

The invention relates to a seat belt retractor including two force-limiting devices acting in parallel for a motor vehicle impact protection system.

(2) Description of Related Art Including Information Disclosed Under 37 CFR 1.97 and 1.98

A retractor of the above-mentioned type is, for example, known from WO 96/32303. The seat belt retractor described therein includes a two-piece belt shaft having a torsion bar disposed between the parts of the belt shaft. A seat belt can be wound onto one part of the belt shaft, the body of the belt shaft, while the other part of the belt shaft, also referred to as profile head, is blocked in a vehicle-fixed manner when a blocking device is activated in a vehicle-sensitive or belt-sensitive manner. In the event that the belt extraction force exceeds a predetermined belt extraction force when the second part of the belt shaft is blocked, the body of the belt shaft can rotate about its longitudinal axis in the direction of the belt extraction owing to a plastic deformation of the torsion bar. The predetermined belt extraction force to be overcome in this case is defined by the plastic deformation limit of the torsion bar. The torsion bar thus forms the first force-limiting device.

Furthermore, a second force-limiting device is provided, which acts in parallel to the torsion bar, i.e. it is also disposed between the first and second part of the belt shaft. The force-limiting characteristics can be modified using the second force limiting device independent of the torsion bar, so that, for example, degressive or progressive force-limiting characteristics can be realized. Furthermore, a short-term decrease or increase of the belt extraction force can be compensated in the initial phase of the activation of the first force-limiting device to the extent that the force-limiting characteristic of the seat belt retractor is in general more uniform and, extends as directly as possible along with the beginning of belt extraction according to a predetermined force-limiting level. The second force-limiting device can be realized by different plastically- or elastically-deformable sections, such as e.g. securing pins or a torsion sleeve which connects both parts of the belt shaft parallel to the torsion bar. The belt extraction length, during which the second force-limiting device is acting, is limited by the constructive configuration of the plastically deformable section.

Moreover, a seat belt retractor is known from DE 201 10 423 U1 wherein the second force-limiting device is formed by a metal strip which is pulled through a chicane during the force-limited belt extraction. The advantage of this solution is that the belt extraction length, during which the second force-limiting device acts, can be considerably extended by using a correspondingly long metal strip, wherein the dissipated energy and the resulting force-limiting level remain almost the same while the metal band is being pulled through the chicane. The chicane itself may be formed by an insert which is suspended on one of the parts of the belt shaft, while the metal strip is respectively held on the other part of the belt shaft in a manner which ensures tensile strength.

BRIEF SUMMARY OF THE INVENTION

The object of the invention is to provide a seat belt retractor including two force-limiting devices acting in parallel which should be formed as simple as possible.

This object is achieved by the proposed seat belt retractor having the features described herein.

According to the basic concept of the invention, it is proposed that the first and second parts of the belt shaft axially overlap in a section between the legs of the frame of the seat belt retractor by forming an annular space, and that the second force force-limiting device is formed by a band element which abuts on the radial outer wall of the annular space with a first section, and against on the radial inner wall of the annular space with a second section, and is deflected in at a deflection fitting between the first and the second segment, wherein during a relative movement between the first part and the second part, the band element can be unwound or wound from the outer wall onto the inner wall or vice versa by a circulation around the deflection fitting.

Compared to the solutions known from prior art, the proposed belt retractor has several advantages. The seat belt retractor can be mounted in a cost-effective and easy manner because the second force-limiting device is formed only by the deflected band element. Further, components required up to now, such as e.g. a chicane, are not required. In addition, the energy is only dissipated by the rotation of the deflection fitting wherein the band element is deformed by a continuous unchanging bend at a constant level in an energy-dissipating manner. The duration of the effect of the second force-limiting device can further be extended by selecting an accordingly long band element.

An especially simple configuration of the seat belt retractor can be provided by attaching the band element with interference-fit to one end of the first or second section against the direction of rotation of the first part to the first or second part of the belt shaft during the force-limited belt extension. Using the proposed attachment of the band element, it is unwound or wound up directly by the transmission of a pressing force at the beginning of the relative movement. In this case, it is especially advantageous, that separate parts or mounting steps are not necessary for fastening the band element and the band element only has to be inserted.

It is further proposed that the band element include at least has two deflection fittings which are arranged symmetrically to the axis of rotation of the seat belt retractor. Using the two proposed deflection fittings, forces acting symmetrically can be realized during the activation of the second force-limiting device, which at least partially cancel each other out to reduce the load on all components.

In this case, the second part of the belt shaft can have a radially directed slot into which the band element is inserted. The slot allows for the use of only a single band element, which is wound onto the end sections in the annular space and has two deflection fittings, which are connected to one another by the central section of the band element guided through the slot. The central section of the band element guided through the slot simultaneously serves to create a tractive connection of the two deflection fittings, so that the band element itself does not need to be fastened separately, but merely suspended in the slot.

It is furthermore proposed that the outer radial wall and the inner radial wall of the annular space are spaced apart at an increasing or decreasing distance in the circumferential direction. The force-limiting level resulting from the second force-limiting device can be increased or decreased by the increasing or decreasing distance of the walls because the dissipated energy directly depends on the deflection radius, that is, on the distance of the walls. In this context, the smaller the deflection radius, that is, the smaller the distances of the walls, the greater is the dissipated energy and the resulting force limiting level. Progressive as well as degressive force-limiting courses can thus be realized in a simple manner using the second force limiting device.

The proposed second force-limiting device is in particular advantageous, if the first force-limiting device is a speed-controlled force-limiting device. Speed-controlled force-limiting devices in principle have the disadvantage that the predetermined force-limiting level is only achieved at a specific speed, or drops to a lower force-limiting level after overcoming a breakaway torque for a short time. This increase in the force-limiting level, or the short-term drop of the force limiting level, can at least in part be compensated by the force-limiting level caused by the second force limiting device, so that the course of the force-limitation course is on the whole more uniform, and the predetermined force-limiting level is reached earlier.

It is further proposed that the speed-controlled force limiting device is designed annular and disposed concentric to the second force-limiting device. Using the proposed design and arrangement of the force-limiting devices the radial and circumferential forces can be compensated, so that the first and the second part of the belt shaft is loaded as little as possible during the activation of the force-limiting devices.

The forces and torques acting during the activation of the force-limiting devices can be further decreased by arranging the speed-controlled force-limiting device axially overlapping relative to the first force-limiting device.

It is also proposed that plastically deformable formations are provided on the first or second part of the belt shaft, which formations protrude into the region of the annular space the deflection fitting passes through during rotation. As the formations protrude into the area passed through by the deflection fitting, as proposed, they are either sheared off or the band element itself is deformed, so that additional energy is dissipated parallel to the energy dissipated in the rotating deflection fitting, leading to a short-term increase of the force-limiting level.

The force-limiting level of the seat belt retractor can also be decreased by sectionally weakening the band element using recesses, a lesser width, or a lesser thickness. In this case, the decrease in the force limiting level is based on a targeted weakening of the material of the band element in one section, as a result of which less energy is dissipated during the passage of the respective section through the deflection fitting.

According to a further preferred embodiment, it is proposed that at least one of the recesses is configured as a predetermined breaking point that breaks during the passage through the deflection fitting. The band element thus breaks in the region of the predetermined breaking point, so that during further rotation of the belt shaft, a deformation no longer occurs, or only occurs for a short time and very marginally, and the force limitation caused by the band element is abruptly lowered. The band element can have two predetermined breaking points that break at the same time, or even two predetermined breaking points that break in a time-displaced manner, whereby the force-limiting level can be decreased stepwise or also abruptly to zero.

BRIEF DESCRIPTION OF THE SEVERAL VIEWS OF THE DRAWINGS

The invention will hereinafter be described in more detail on the basis of preferred embodiments with reference to the attached Figures:

FIGS. 1a, 1b through 5 show an inventive seat belt retractor including a first force-limiting device in the form of a speed-controlled force-limiting device;

FIGS. 6a, 6b through 10 show an inventive seat belt retractor including a first force-limiting device in the form of a torsion bar;

FIGS. 11a, 11b, 12a and 12b show a second force-limiting device in the form of a band element having recesses or formations protruding into the deformation path of the deflection fitting;

DETAILED DESCRIPTION OF THE INVENTION

Figure 1B:
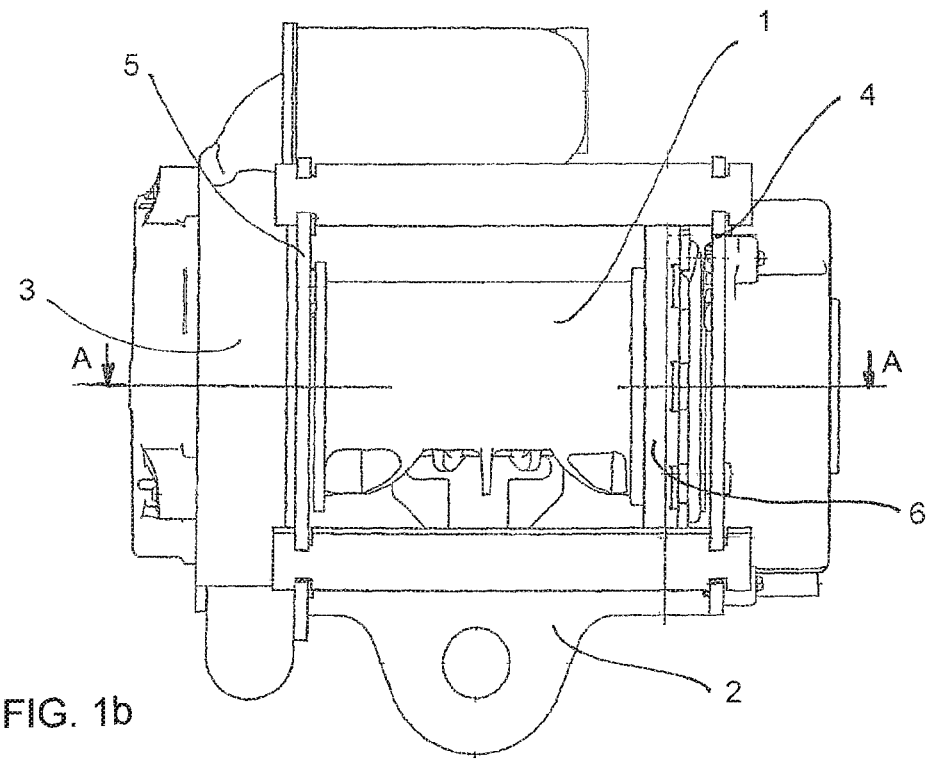
Figure 1A:
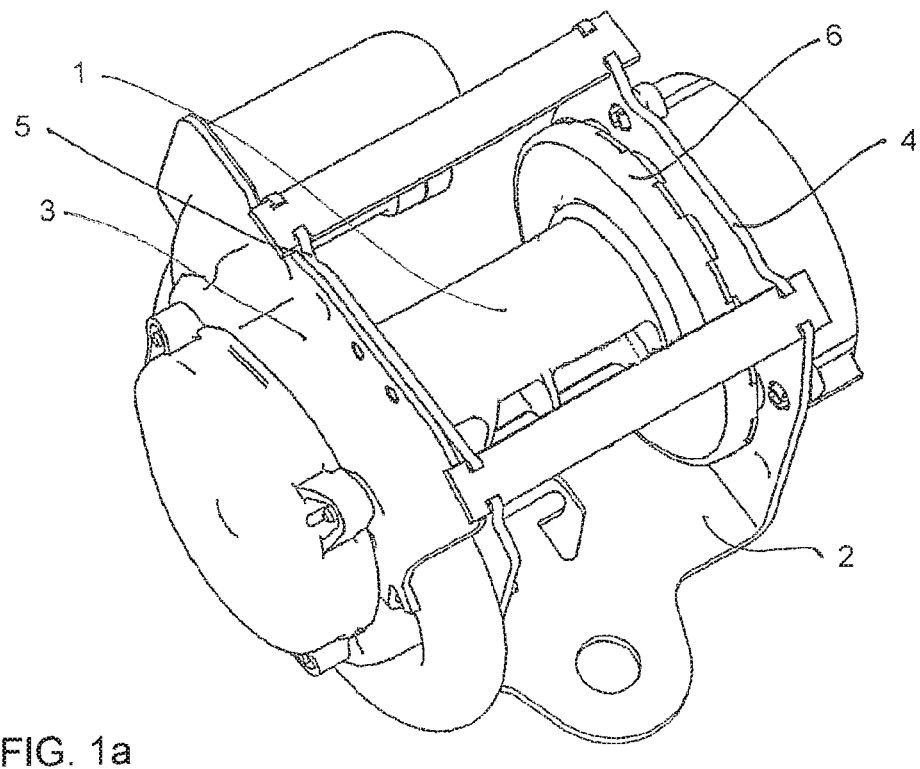

FIGS. 1a and 1b show a seat belt retractor including a two-piece belt shaft 1 rotatably supported in the legs 4 and 5 of a frame 2. A pyrotechnic tightening device 3 (pretensioner) is provided on the leg 5, which abruptly drives the belt shaft 1 in the winding direction in an early phase of an accident prior to the forward displacement of the occupants and pulls out any possible slack in the seat belt. A first force-limiting device 6 in the form of an annular speed-controlled force-limiting device disposed concentric to the belt shaft 1 is further provided on the leg 4.

Figure 2:
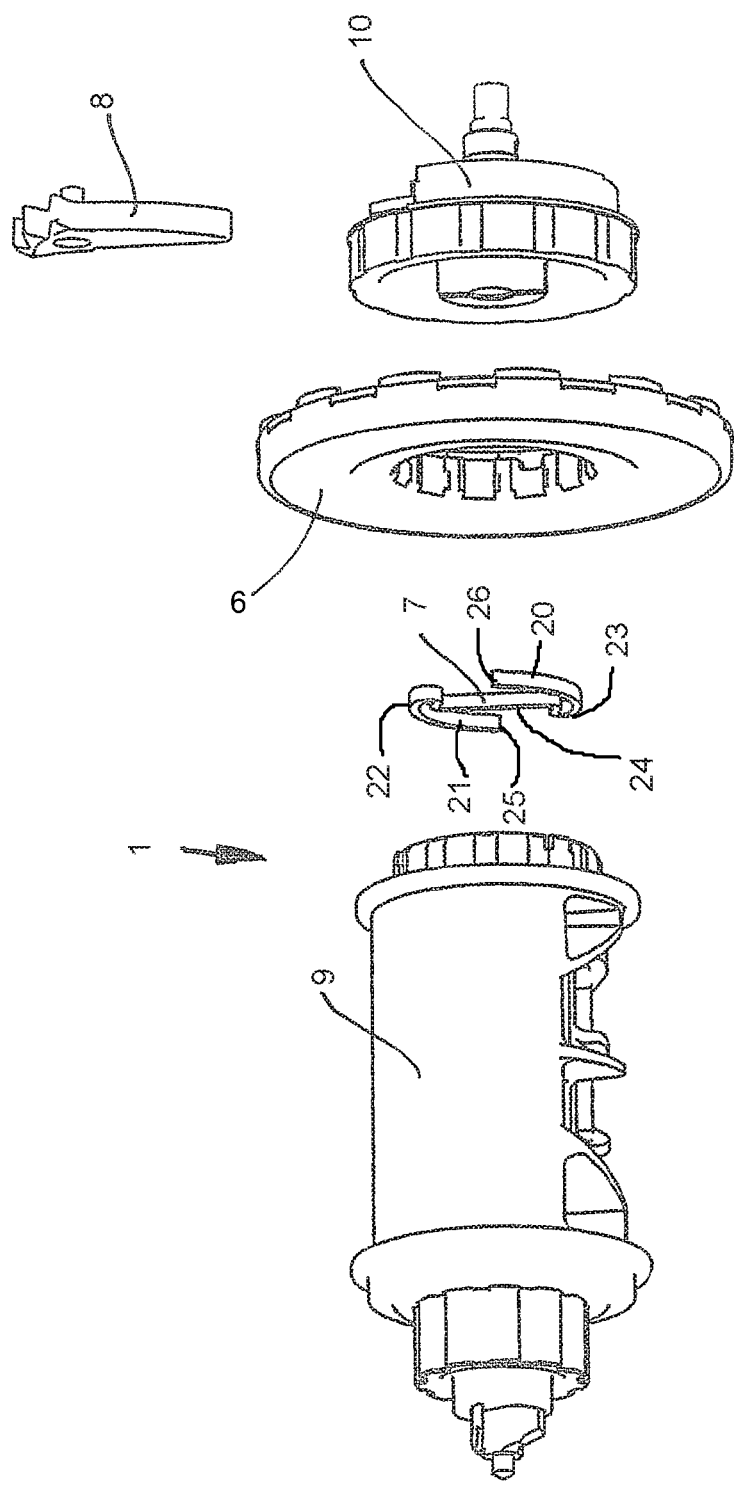

FIG. 2 shows an exploded view of the two-piece belt shaft 1 with a first part 9 and a second part 10. In this case, the first part 9 is a body of the shaft of the seat belt onto which a seat belt can be wound, and the second part 10 is a profile head, which carries a blocking device 8 in the form of a blocking latch. If a predetermined acceleration value of the vehicle or of the seat belt extraction is exceeded, the blocking device 8 is activated, that is, the blocking latch inserts into a gear on the leg 4 and blocks the second part 10 in a fixed manner with respect to the vehicle against the direction of the belt extension. Furthermore, in addition to the first force-limiting device 6, a second force-limiting device 7 is visible, which, as will be described hereinafter, is also disposed between the two parts 9 and 10 of the belt shaft 1 and acts parallel to the first force-limiting device 6. At the same time, the two parts 9 and 10 of the belt shaft 1 are connected to each other via the two force limiting devices 6 and 7, so that during normal use, that is, prior to the activation of the force-limiting devices 6 and 7, they should be considered as a firm assembly.

Figure 3:
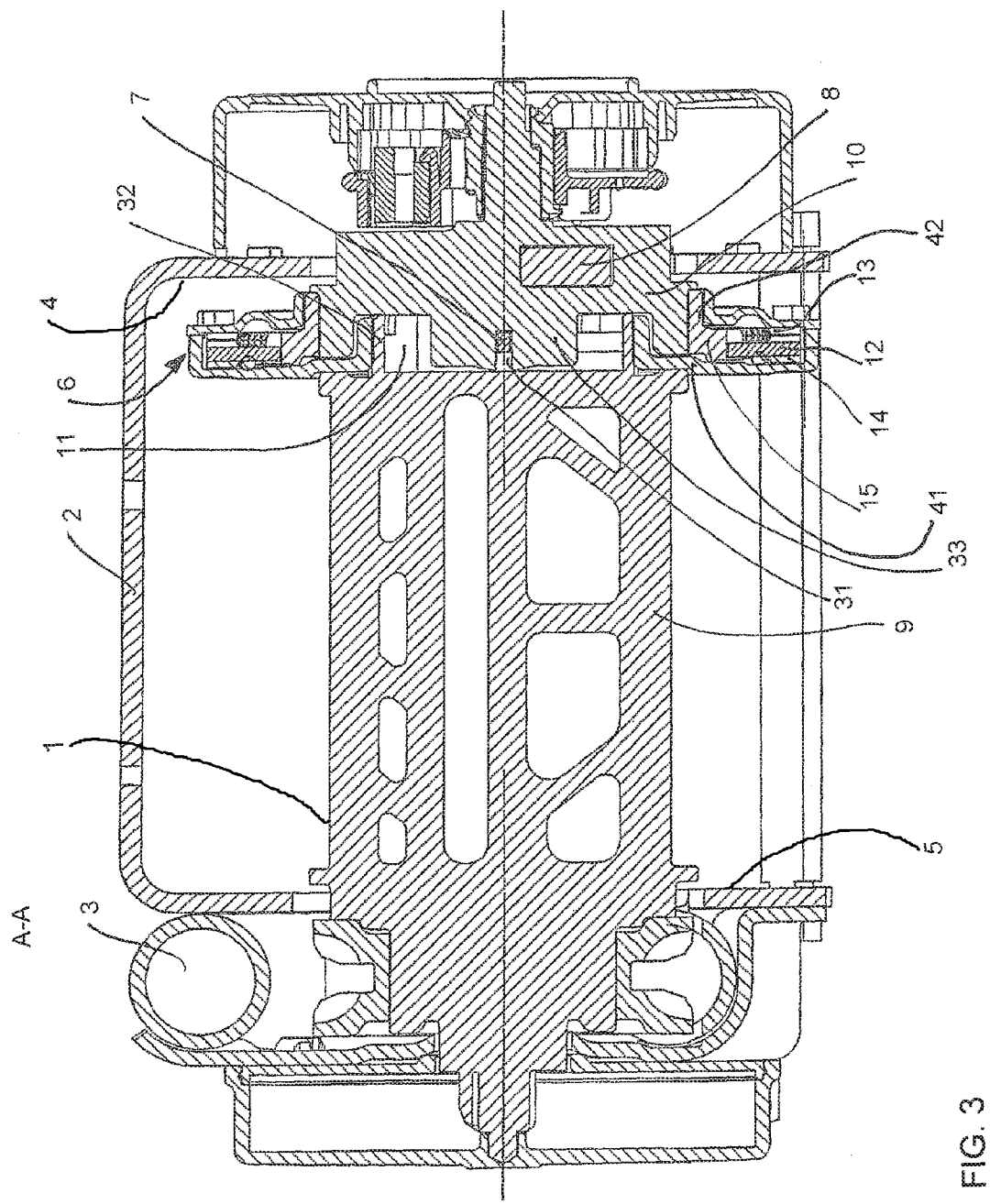

FIG. 3 shows the seat belt retractor from a top cross-sectional view A-A of FIG. 1b. The speed-controlled force-limiting device 6 is fastened to a first subassembly 41 on the first part 9 of the belt shaft 1, and to a second subassembly 42 on the second part 10 of the belt shaft 1. Furthermore, an oscillating disk 12 is provided which alternatingly engages with the first subassembly 41 or with the second subassembly 42 via the gear pairs 13 and 14 provided laterally. The oscillating disk 12 oscillates to and fro perpendicular to the relative movement during the force-limited movement, whereby it is periodically accelerated and decelerated.

As a result of the deceleration and acceleration of the oscillating disk 12 described above, the energy dissipation underlying the force limitation is affected. The movement of the two parts 9 and 10 of the belt shaft 1 relative to each other is, in this case, only controlled by the oscillating disk 12 because it is in the first place only made possible by the oscillating movement of the oscillating disk 12. Since the dissipated energy depends on the oscillating frequency, and the oscillating frequency directly depends on the speed of the parts moved relative to one another, this is a speed-controlled force-limiting device.

Furthermore, the second force 1 limiting device 7 is visible in the form of a band element, which is inserted in a slot 31 running radially and centrally in a cylindrical shoulder 33 provided on the second part 10. The shoulder 33 is radially encompassed on the outside at a distance from a ring 32 which protrudes axially from the first part 9, so that an enclosed annular space 11 is formed between the first and second part 9 and 10.

Figure 4:
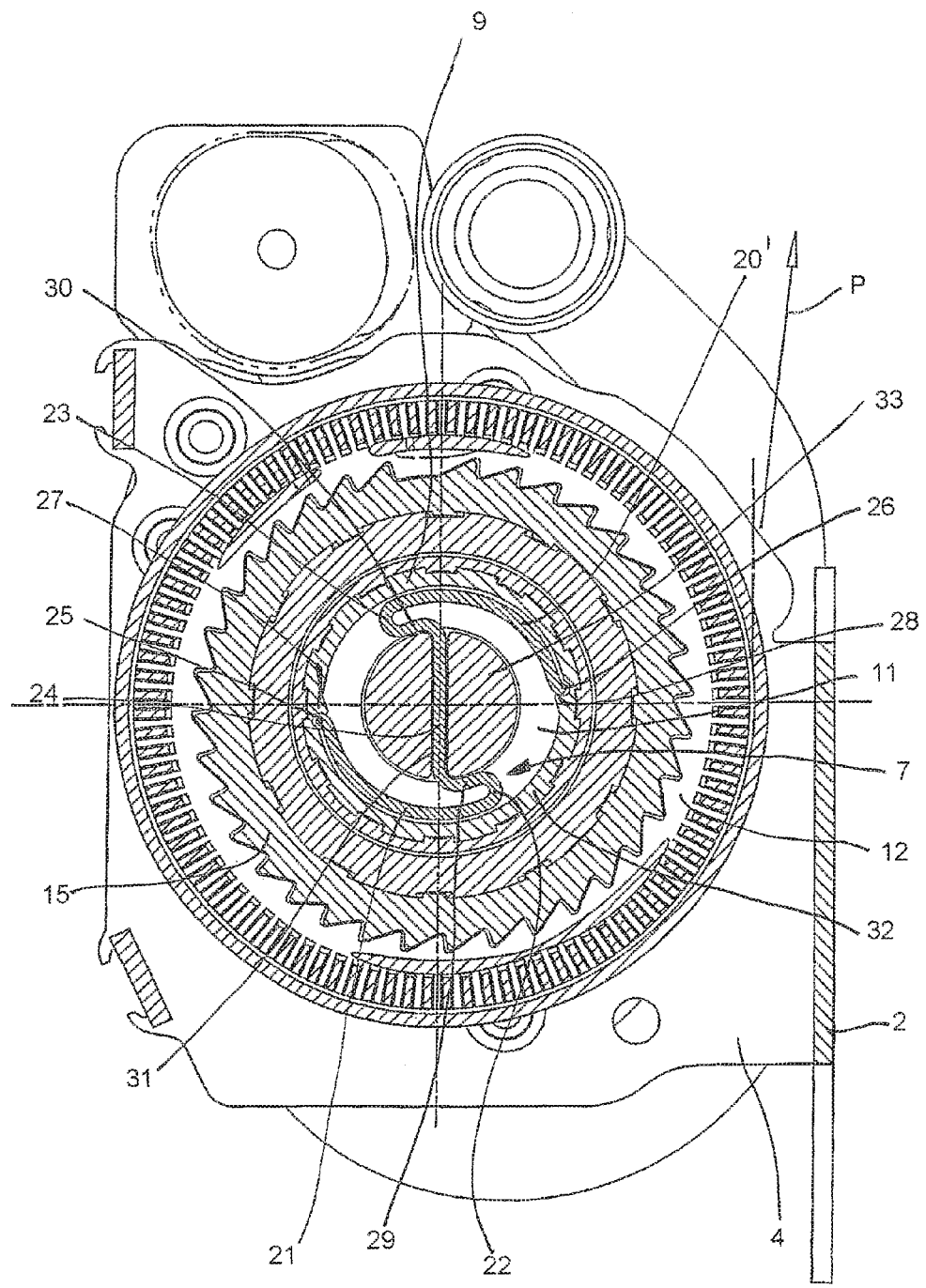

A longitudinal section of the seat belt retractor across a lateral view of the first force-limiting device 6 is visible in FIG. 4. The second force limiting device 7, which is formed by the band element, is arranged point-symmetrical to the axis of rotation of the seat belt retractor, and starting from a central section 24 extending straight through the slot 31 on two sides in each of the sections 29 and 30 abutting the outer edge surface of the cylindrical shoulder 33. The band element is folded back against the direction of the belt extraction by the sections 29 and 30 at deflection sections 22 and 23 relative to a section 20 and 21. The sections 20 and 21 abut on the radial inner edge surface of the ring 32. The ring 32 is provided, at two points, with projections 27 and 28 protruding radially inward, on which the band element abuts with interference-fit with the ends 25 and 26 against the direction of the belt extraction.

In this case, the first force-limiting device 6 is formed annular and arranged concentric to the second force-limiting device 7 and to the annular space 11. Furthermore, the first and the second force limiting device 6 and 7 and the first and the second parts 9 and 10 of the belt shaft 1 overlap in the axial direction of the seat belt retractor in the region of the force-limiting devices 6 and 7, so that a very simple constructive design requiring a very small installation space results. Favorable force and torque-ratios with the least-possible axial forces can furthermore be achieved in this way, so that the two parts 9 and 10 of the belt shaft 1 are securely held together even during the activation of the force-limiting devices 6 and 7.

Figure 5:
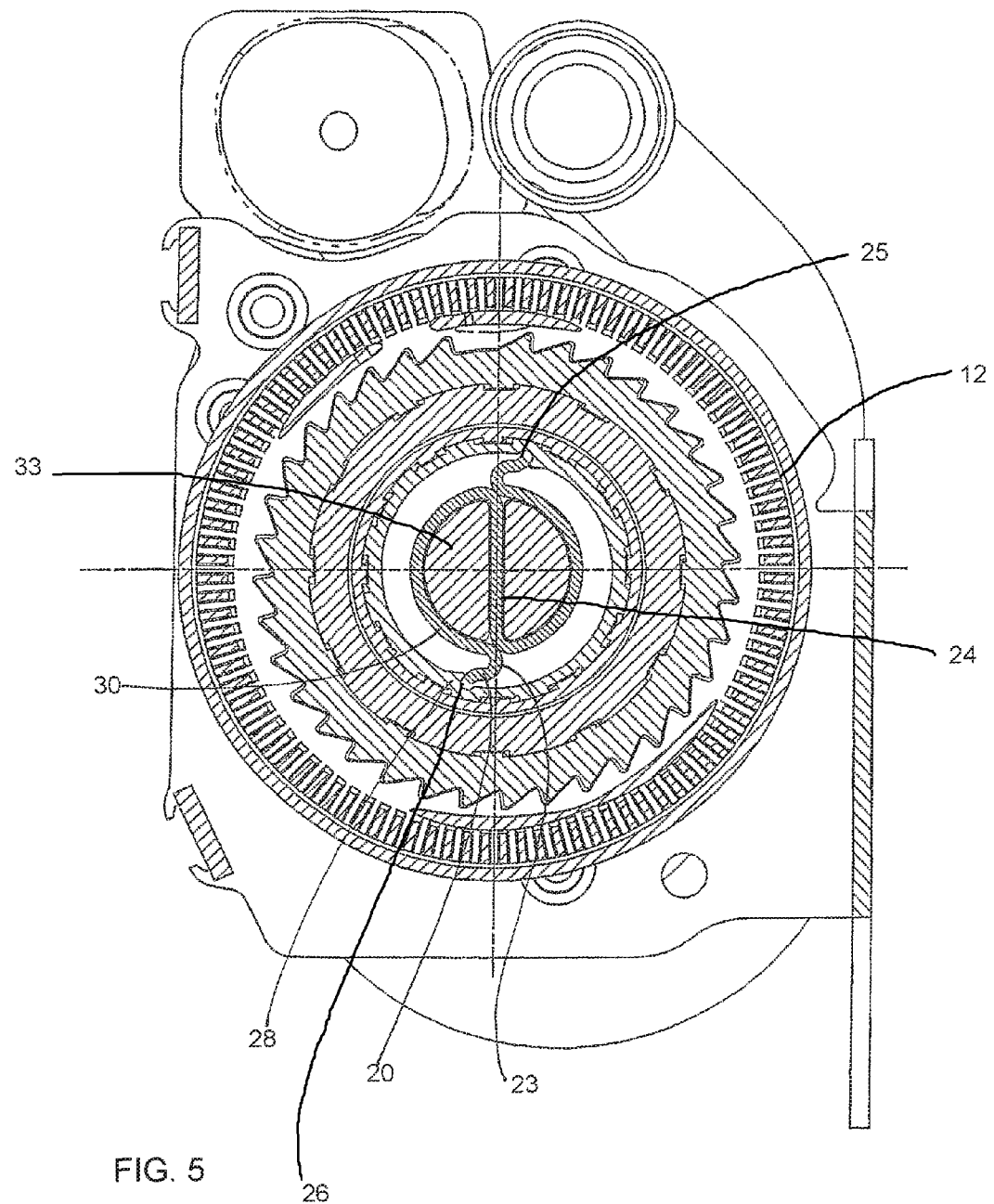

In the event that the belt extraction force exceeds a predetermined value in the direction P of the arrow when the second part 10 of the belt shaft 1 is blocked, the first part 9 of the belt shaft 1, and thus also the ring 32, starts to rotate counterclockwise. As a result of the rotation of the ring 32, the sections 20 and 21 are picked up by the interference-fit contact of the ends 25 and 26 and wound onto the outer edge of the cylindrical section 33 of the second part 10 of the belt shaft 1 by circulating around the deflection sections 22 and 23 until the position shown in FIG. 5 is achieved, that is, until the ends 25 and 26 no longer abut with interference-fit on the projections 27 and 28. The band element is wound flat in the rotating deflection sections 22 and 23, whereby the energy underlying the force-limitation is dissipated. Since the outer radius of the cylindrical section 33 is smaller than the inner radius of the ring 32, the angle of rotation traversed is larger than the angle of the sections 20 and 21 prior to the start of the force-limited belt extraction.

The advantage of this special embodiment is that the disadvantage that the speed-controlled first force-limiting device 6 first requires a certain relative speed in order to dissipate enough energy, that is, that the force-limiting level only increases, or even decreases for a short time after overcoming a breakaway torque, can be compensated by the second force limiting device 7 acting in parallel to the extent that the course of the force-limitation is in general more uniform and the actuating force-limiting level is closer to the predetermined force-limiting level. On addition of the force-limiting level caused by both force-limiting devices 6 and 7, the total course of the force-limitation can also be positively modified by achieving the predetermined force limiting level significantly earlier.

Figure 6B:
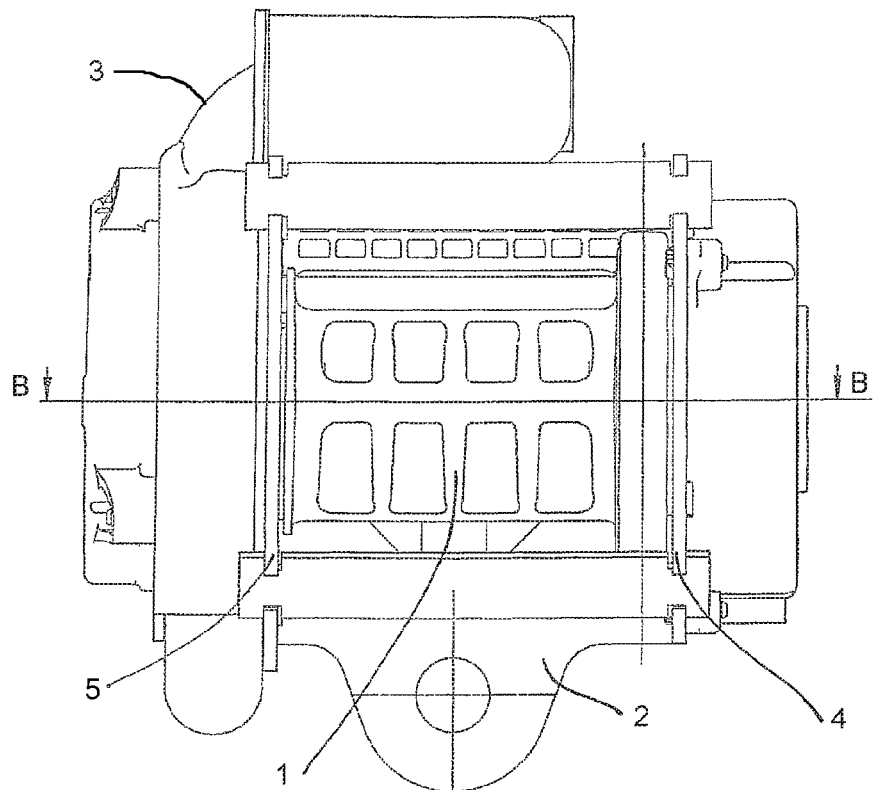
Figure 6A:
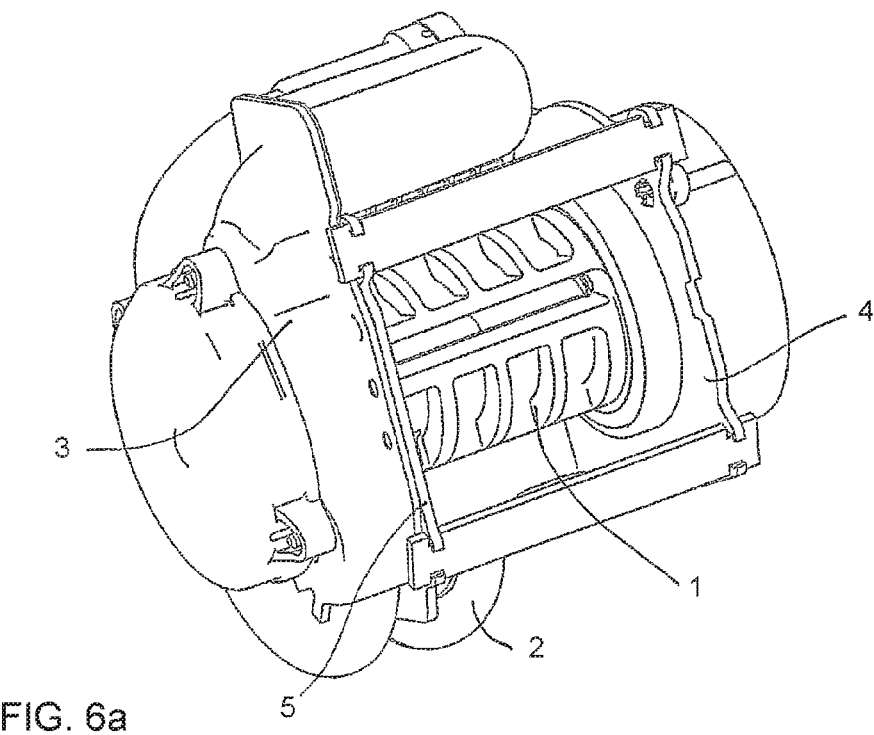
Figure 7:
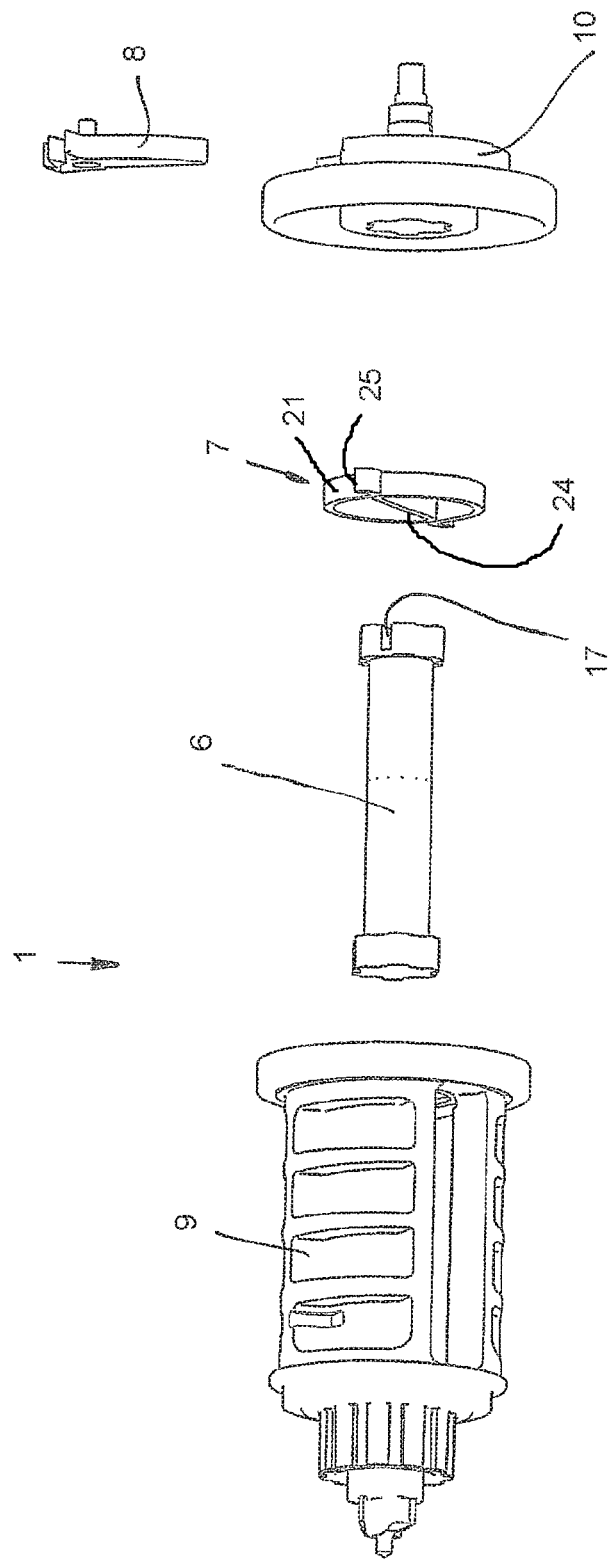

FIGS. 6a, 6b and 7 show an alternative embodiment of the invention including a seat belt retractor of an identical design wherein the first force-limiting device 6 is formed by a torsion bar. The torsion bar has a groove 17 on the end facing the second part 10 of the belt shaft, into which the band element is inserted.

Figure 8:
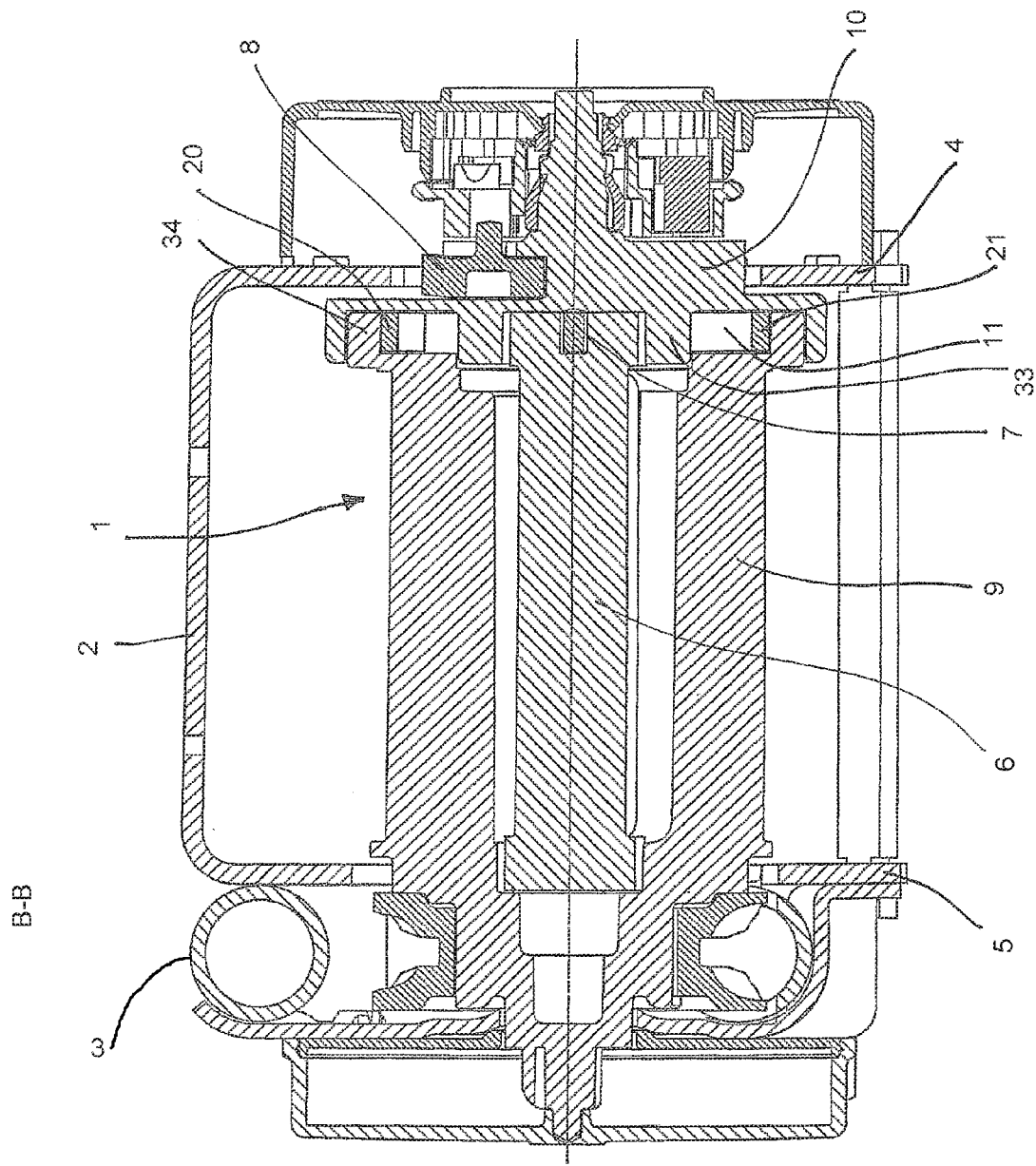
Figure 9:
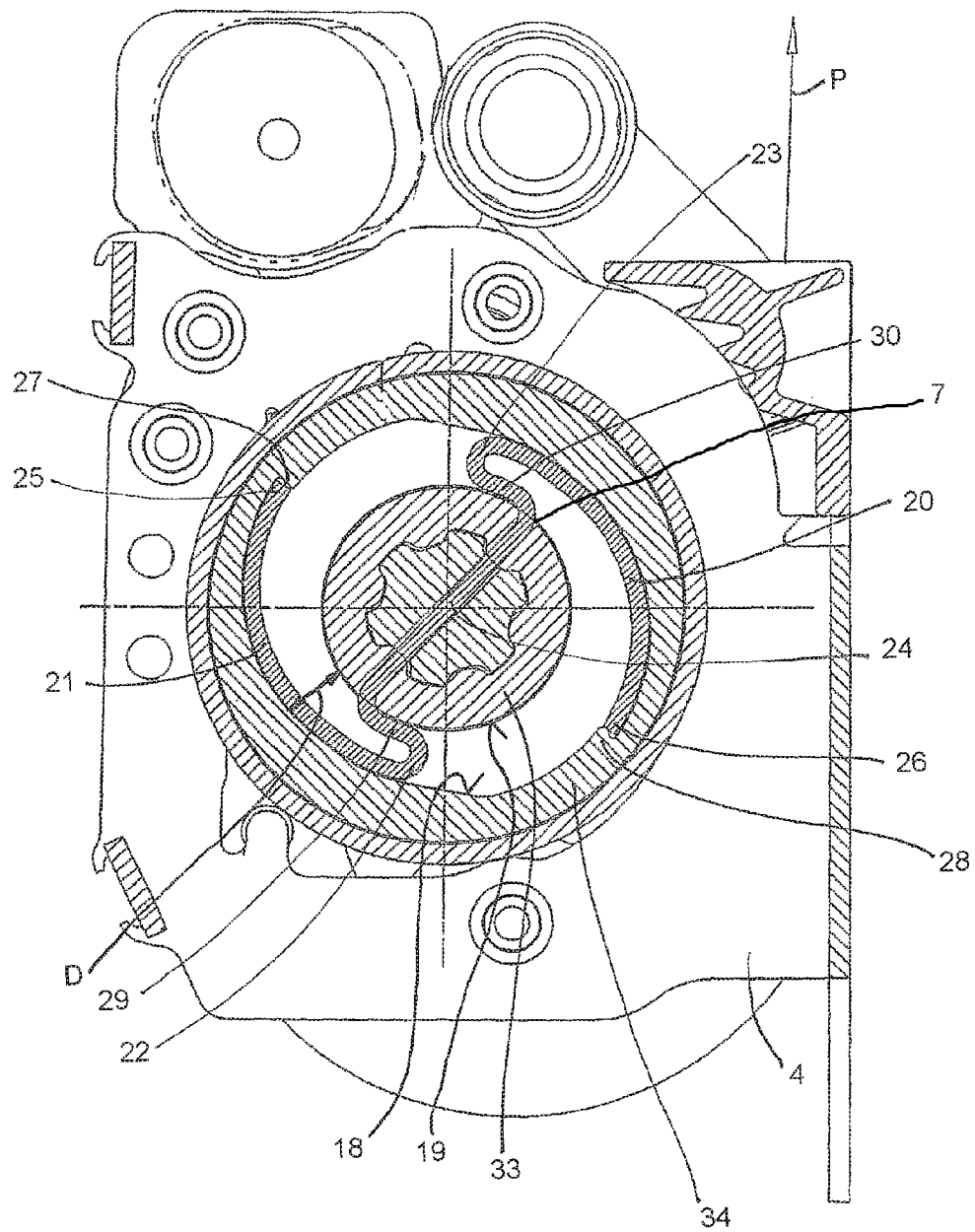

In FIGS. 8 and 9, the same seat belt retractor is visible in a cross-sectional view B-B of the upper drawing of FIG. 6 and in a cross-sectional view of the second force limiting device 7 and the end of the torsion bar. In this case, the annular space 11 is likewise delimited by a radial inner cylindrical shoulder 33 of the second part 10 and a ring 34 axially protruding on the first part, wherein the function and effect of the second force-limiting device 7 is identical to that in the exemplary embodiment of FIGS. 1 to 5. In this case, the band element is inserted with the central section 24 through a groove in the end of the torsion bar and through a groove in the cylindrical step 33, so that the second part 10 of the belt shaft 1, the torsion bar, and the band element are firmly connected to one another so that they rotate together.

Furthermore, the annular space 11 is dimensioned such that the distance D of the walls 19 and 18 radially delimiting the annular space 11 on the inner and outer side increases toward the radially outer ends 25 and 26 of the sections 20 and 21 starting at the deflection sections 22 and 23. Since the energy dissipated in the rotating deflection sections 22 and 23 directly depends on the distance D, namely according to the relationship that the smaller the distance D is in the region of the deflection sections 22 and 23, the greater is the dissipated energy in the deflection sections 22 and 23; a degressive force-limitation course of the second force limiting device 7 can thereby be achieved. This course of the degressive force limitation runs against the increasing force-limiting level of the first force-limiting device 6, so that a more constant force-limiting level can in general be achieved on the whole. Insofar as this is desired, a progressive force-limitation of the second force-limiting device 7 can also be achieved, while the distance D decreases in the same direction starting at the deflection sections 22 and 23.

Figure 10:
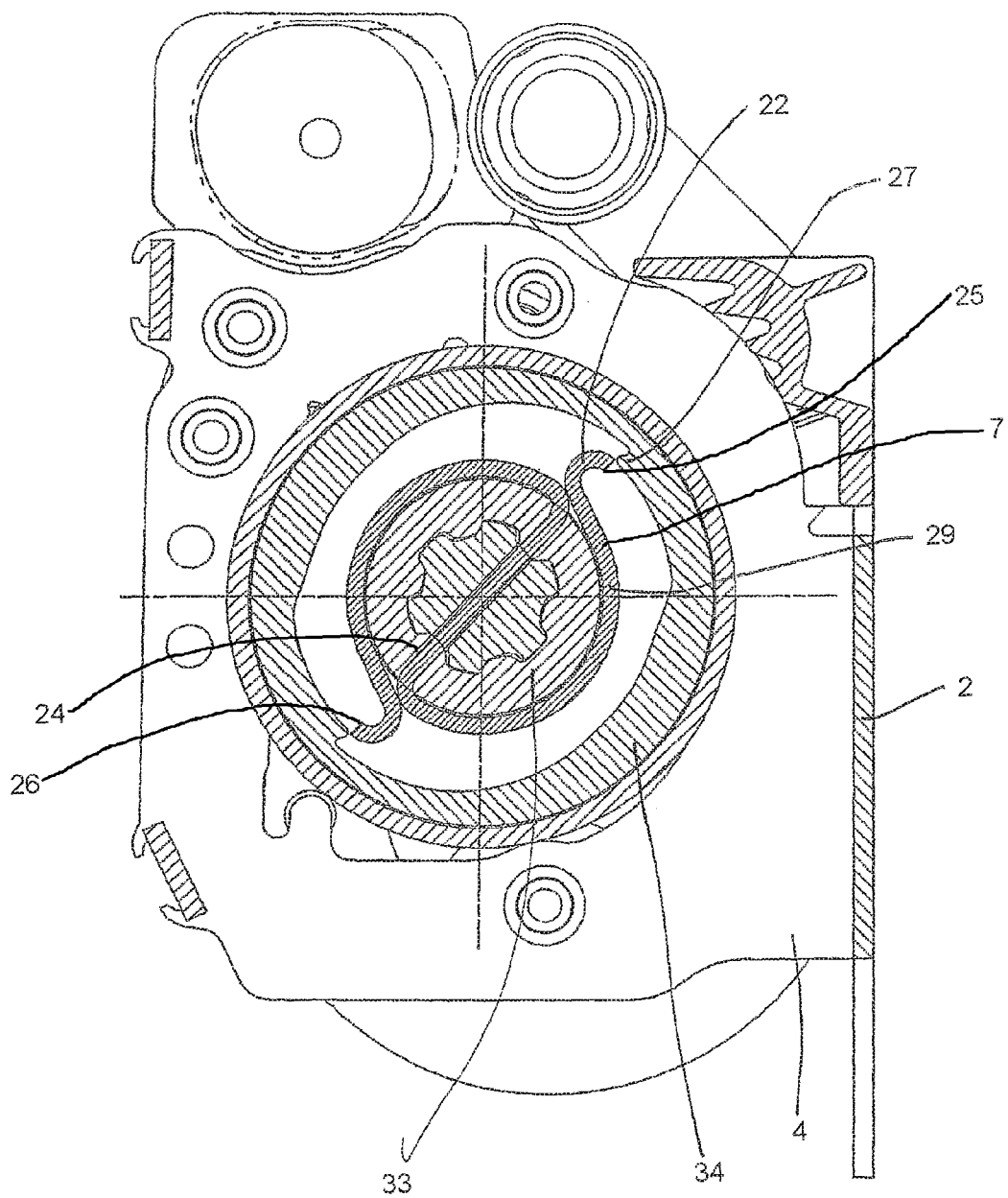

The same seat belt retractor from FIG. 9 is shown in FIG. 10 after the activation of the second force-limiting device 7. Since the connection between the first part 9 and the second part 10 of the belt shaft 1 is canceled by the band element after rotation of the deflection sections 22 and 23, only the first force limiting device 6 is exclusively acting from this angle of rotation.

FIGS. 11a, 11b, 12a and 12b show various additional exemplary embodiments of the second force-limiting device 7, including the force-limiting curves to be achieved thereby. As can be seen all the force limiting curves degressive, that is, continually decreasing in this case. It would, however, also be conceivable to realize a step-like course, for example, by an abrupt decrease or increase of the distance D.

In the exemplary embodiment shown in FIG. 11a, rib-shaped formations 35 protruding laterally into the annular space 11 are provided on the second part 10 of the belt shaft 1, which rib-shaped formations 35 prevent the deflection sections 22 and 23 from rotating, or are even sheared off by the deflection sections 22 and 23 during rotation. As a result of this, the force-limiting level of the second force-limiting device 7 can be increased further from curve 37 to curve 36 shown in FIG. 11b. The increase in the force limiting level caused by the formations 35 is shown by the hatched area 38 in the drawing on the right side of FIG. 11b.

Figure 12A:
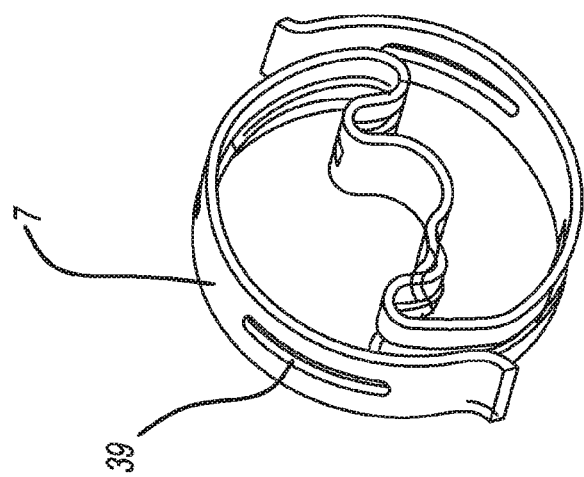
Figure 12B:
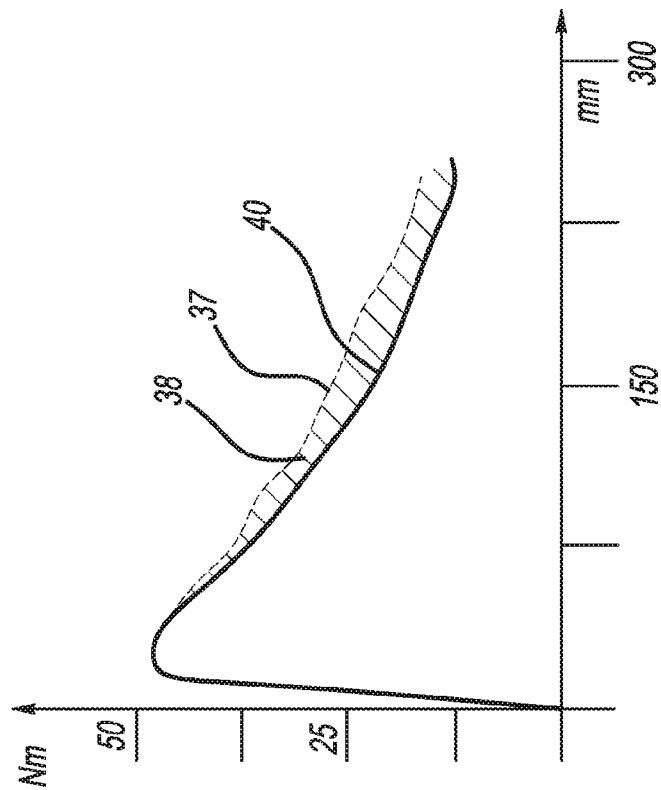
Figure 13A:
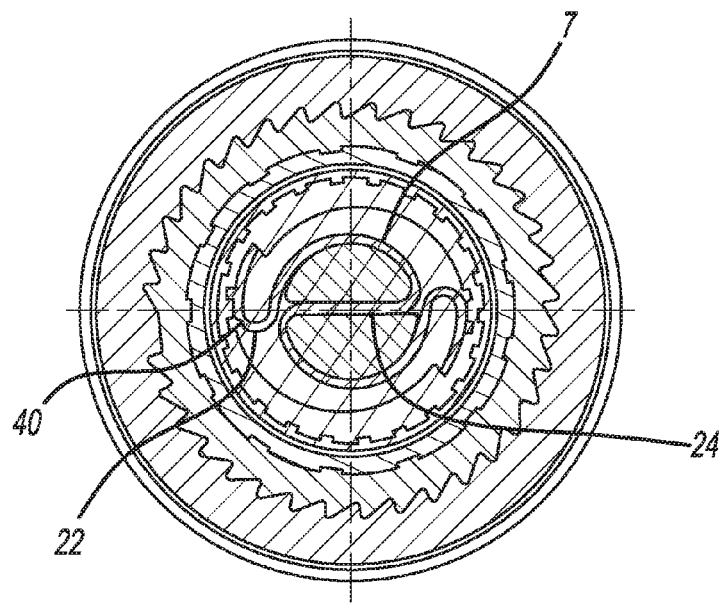
FIGS. 13a through 13d and 14a through 14d show two different embodiments including one band element and having two predetermined breaking points.
Figure 13B:
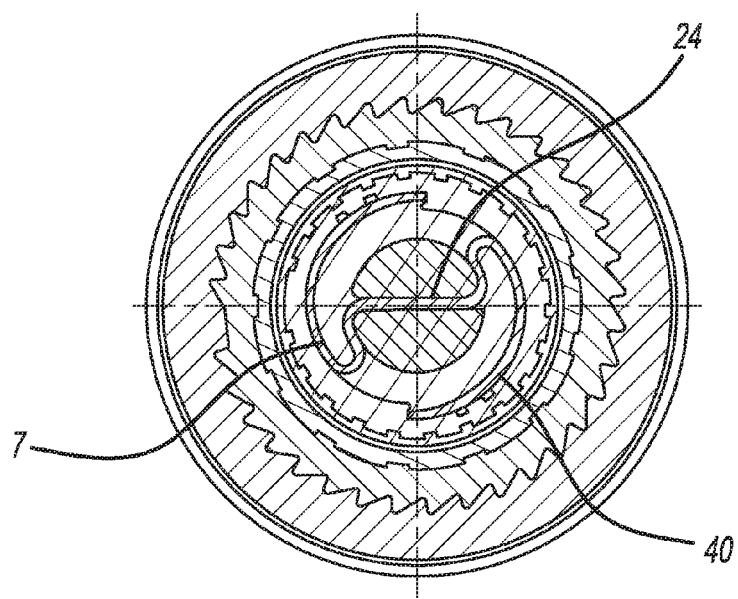
Figure 13C:
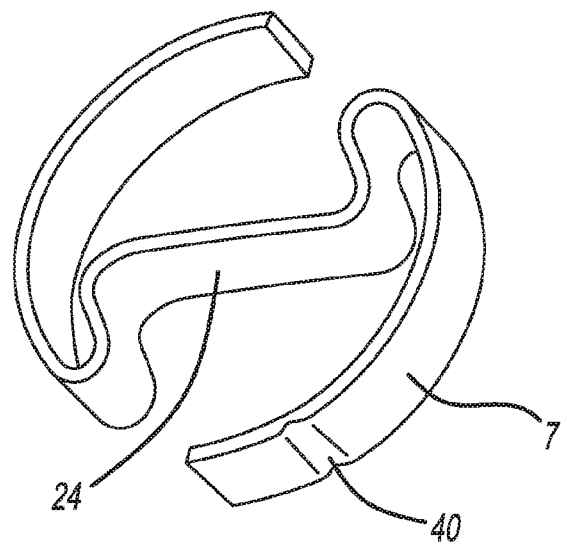
Figure 13D:
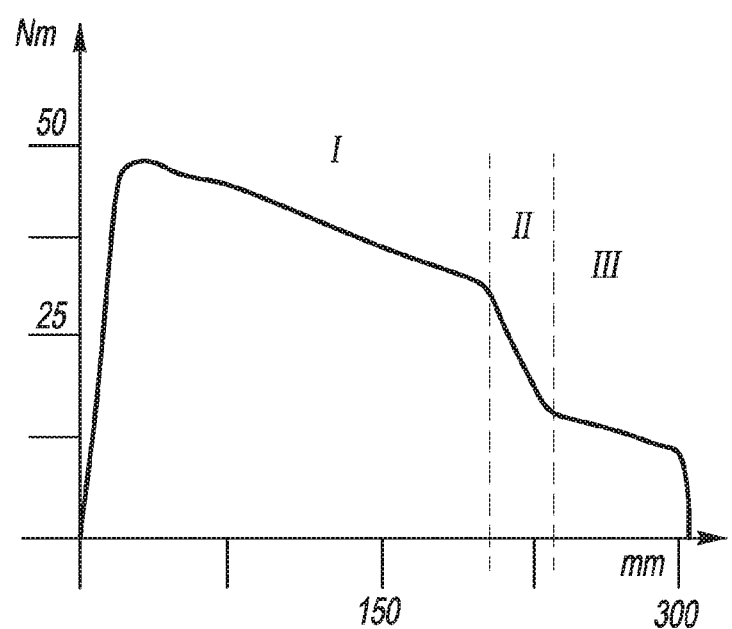
Figure 14A:
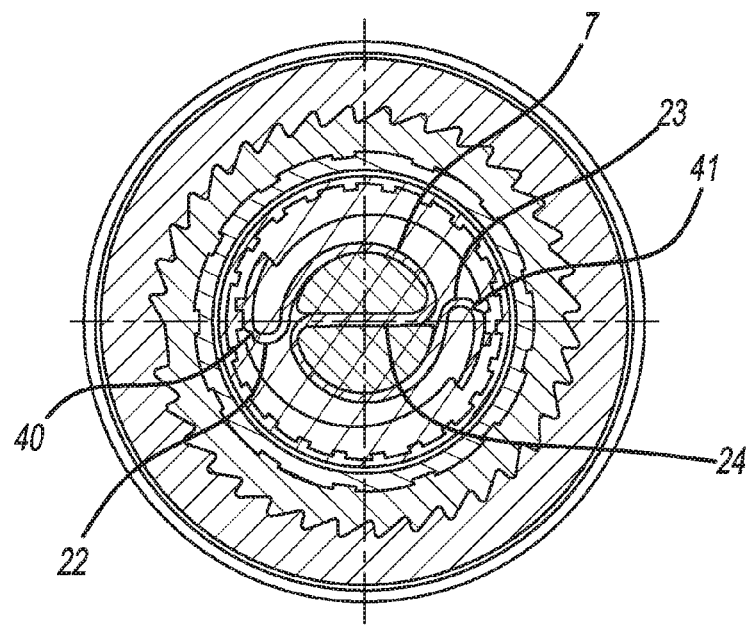
Figure 14B:
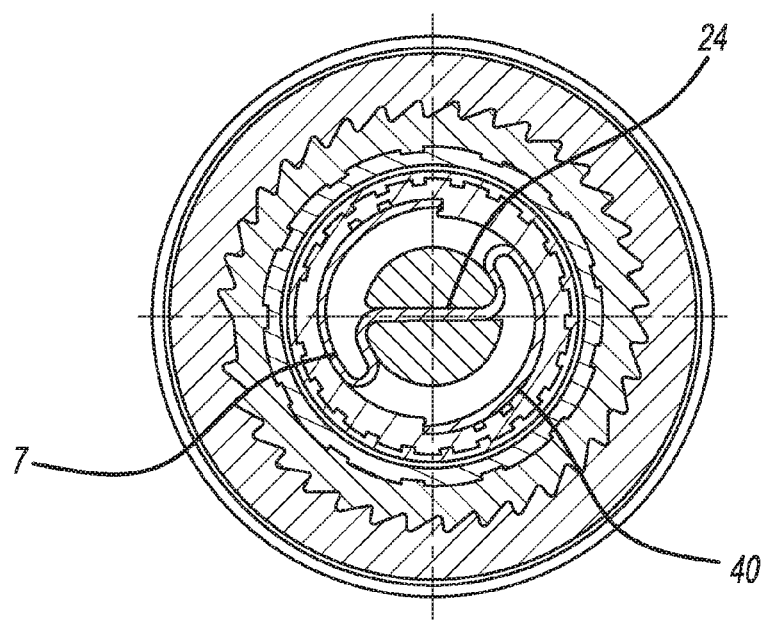
Figure 14C:
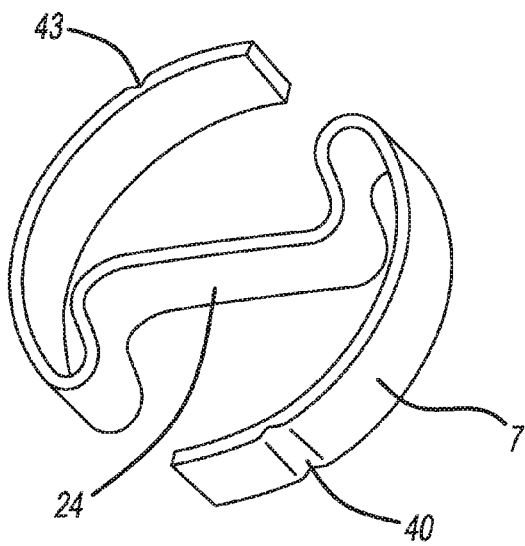
Figure 14D:
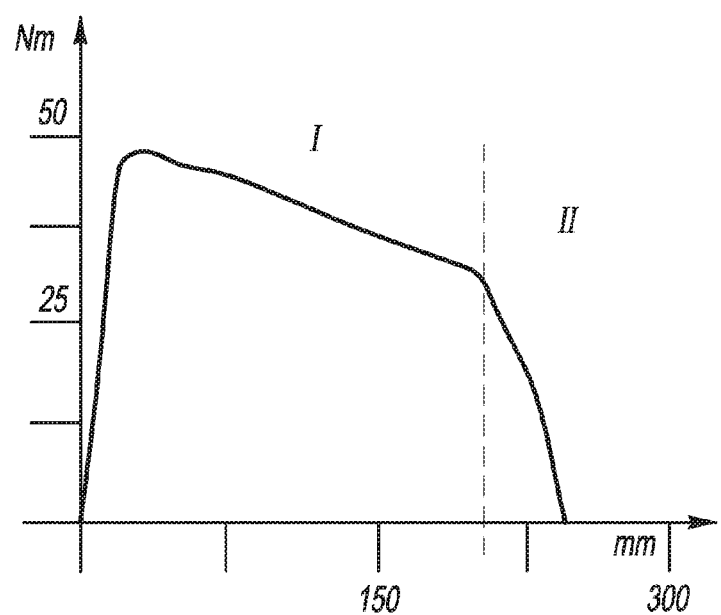

In the exemplary embodiment of the invention shown in FIGS. 12a and 12b, two recesses 39 are provided the band element 7 which reduce the resistance to deformation of the band element in this region. The same effect can also be obtained by reducing the thickness of the material or the width of the band element. Owing to the reduction of the resistance to deformation, the force-limiting curve of FIG. 12b is decreased from the course 37 to the course 40, wherein the decrease in the force limiting level is shown by the hatched area 38.

Another embodiment of the invention is shown in FIGS. 13 a-d, wherein the recess 39 is dimensioned such that it forms a predetermined breaking point 40 which breaks during the passing-through of the deflection sections 22. The predetermined breaking point 40 is dimensioned such that it can transmit the thrusts in the phase of the force-limitation prior to the passing-through of the deflection sections 22, so that the force-limiting level remains unchanged in the region I of FIG. 13d. During the passing-through of the sections fitting 22, the predetermined breaking point 40 breaks, and the force-limiting level abruptly decreases in the region II to a region III. The position of the band element 7 at the time of breaking of the predetermined breaking point 40 is shown in the lower cross-sectional drawing.

A further development of the embodiment is shown in FIG. 14a-d, wherein two predetermined breaking points 40 and 41 are provided, which likewise are formed by weak points in the material, which in turn are formed by recesses 39 or corrugations. Both predetermined breaking points 40 and 43 are arranged such that they simultaneously pass through the deflection sections 22 and 23 and thus break at essentially the same time. As a result of this, the force-limiting level caused by the band element 7 abruptly decreases from the region II of the force limiting curve shown in FIG. 14d to zero, wherein the curve drops steeply due to residual deformations.

In the case that the predetermined breaking points 40 and 43 pass through the deflection sections 22 and 23 at different times, a correspondingly stepped course of the force-limiting curve results.

While the above description constitutes the preferred embodiment of the present invention, it will be appreciated that the invention is susceptible to modification, variation and change without departing from the proper scope and fair meaning of the accompanying claims.

The invention claimed is:

1. A seat belt retractor for a vehicle restraint system having a belt webbing, the vehicle restraint system for use in a vehicle and comprising:
a first and a second load limiting device,
a two-part belt shaft which is rotatably mounted around a rotational axis in at least one leg of a frame and the belt shaft having a first part, onto which the belt webbing can be wound, and a second part, which can be locked in relation to the at least one leg of the frame using a locking device which can be actuated in response to a predetermined acceleration value of the vehicle or of the extraction of the belt webbing being exceeded, and
the first load limiting device which upon activation enables a load-limited relative motion between the first part and the second part, and
the second load limiting device which upon activation acts parallel to the first load limiting device,
the first and the second part of the belt shaft overlap axially forming a ring shaped chamber adjacent the at least one leg of the frame, and
the second load limiting device formed by a band element with a first portion which rests against a radial outer wall of the ring shaped chamber and with a second portion which rests against a radial inner wall of the ring shaped chamber having at least one deflection section extending between the first and the second parts, wherein
the band element, upon a relative motion between the first and the second parts can be wound between the first and the second parts to absorb energy by the at least one deflection section deforming;
wherein the first load limiting device is a speed-controlled load limiting device.

2. The seat belt retractor according to claim 1, wherein the band element includes an end of the first or the second portion that is interference fit on the first or the second part of the belt shaft against the direction of rotation of the first part during the load-limited belt relative motion.

3. The seat belt retractor according to claim 1 wherein the band element further comprises at least two of the deflection sections which are located symmetrically to the rotational axis.

4. The seat belt retractor according to claim 3, wherein the second part of the belt shaft at the front comprises a radially directed groove, in which the band element is inserted.

5. The seat belt retractor according to claim 4 wherein the band element forms a pair of symmetrical ends engaging with projections formed in the second part of the belt shaft, and wherein the ends disengage from the projections upon a relative motion between the first part and the second part exceeding a predetermined magnitude.

6. The seat belt retractor according to claim 1 wherein the radial outer wall and the radial inner wall of the ring chamber form a distance increasing or decreasing in the circumferential direction at various angular positions with respect to the rotational axis.

7. The seat belt retractor according to claim 1, wherein the speed-controlled load limiting device includes a ring-shaped component and is located concentrically to the second load limiting device.

8. The seat belt retractor according to claim 7 further comprising wherein the ring-shaped component forms a first set of teeth which are capable of intermittent engagement with a matching second set of teeth affixed to the belt shaft and wherein the ring-shaped component oscillates in an axial direction along the rotational axis during the relative motion between the first part and the second part.

9. The seat belt retractor according to claim 1 wherein the speed-controlled load limiting device is located to be axially overlapping with respect to the second load limiting device.

10. The seat belt retractor according to claim 1 wherein the band element in sections is weakened by one or more recesses having a smaller width or thickness than other sections of the band element.

11. The seat belt retractor according to claim 10, wherein at least one of the one or more recesses is formed as a predetermined breaking point that breaks during the relative motion between the first and the second part.

12. The seat belt retractor according to claim 1 wherein the second load limiting device provides degressive load limiting force during the load limiting relative rotation between the first part and the second part.

13. The seat belt retractor according to claim 1 wherein the second load limiting device provides progressive load limiting force during the load limiting relative rotation between the first part and the second part.

14. The seat belt retractor according to claim 1, wherein the speed-controlled load limiting device includes an oscillating disk, the oscillating disk oscillating perpendicular to the relative movement of the first and second parts during force-limited movement whereby it is periodically accelerated and decelerated, wherein an oscillating frequency of the oscillating disk is dependent on the speed of the first and second parts moving relative to each other.

15. The seat belt retractor according to claim 1, wherein the first load limiting device is disposed radially outward from the second load limiting device.

16. A seat belt retractor for a vehicle restraint system having a belt webbing, the vehicle restraint system for use in a vehicle and comprising:
 a first and a second load limiting device,
 a two-part belt shaft which is rotatably mounted around a rotational axis in at least one leg of a frame and the belt shaft having a first part, onto which the belt webbing can be wound, and a second part, which can be locked in relation to the at least one leg of the frame using a locking device which can be actuated in response to a predetermined acceleration value of the vehicle or of the extraction of the belt webbing being exceeded, and
 the first load limiting device which upon activation enables a load-limited relative motion between the first part and the second part, and
 the second load limiting device which upon activation acts parallel to the first load limiting device,
 the first and the second part of the belt shaft overlap axially forming a ring shaped chamber adjacent the at least one leg of the frame, and
 the second load limiting device formed by a band element with a first portion which rests against a radial outer wall of the ring shaped chamber and with a second portion which rests against a radial inner wall of the ring shaped chamber having at least one deflection section extending between the first and the second parts,
 wherein the band element, upon a relative motion between the first and the second parts can be wound between the first and the second parts to absorb energy by the at least one deflection section deforming;
 wherein the first or the second part of the belt shaft includes an elastically or plastically deformable element, which extends axially into the region of the ring chamber passed through by the at least one deflection section during relative rotation of the first and second parts, wherein the at least one deflection section will contact the elastically or plastically deformable element during the relative rotation.

17. A seat belt retractor for a vehicle restraint system having a belt webbing, the vehicle restraint system for use in a vehicle and comprising:
 a first and a second load limiting device,
 a two-part belt shaft which is rotatably mounted around a rotational axis in at least one leg of a frame and the belt shaft having a first part, onto which the belt webbing can be wound, and a second part, which can be locked in relation to the at least one leg of the frame using a locking device which can be actuated in response to a predetermined acceleration value of the vehicle or of the extraction of the belt webbing being exceeded, and
 the first load limiting device which upon activation enables a load-limited relative motion between the first part and the second part, and
 the second load limiting device which upon activation acts parallel to the first load limiting device,
 the first and the second part of the belt shaft overlap axially forming a ring shaped chamber adjacent the at least one leg of the frame, and
 the second load limiting device formed by a band element with a first portion which rests against a radial outer wall of the ring shaped chamber and with a second portion which rests against a radial inner wall of the ring shaped chamber having at least one deflection section extending between the first and the second parts,
 wherein the band element, upon a relative motion between the first and the second parts can be wound between the first and the second parts to absorb energy by the at least one deflection section deforming;
 wherein the ring shaped chamber is defined radially between a ring that protrudes axially from the first part and a cylindrical shoulder of the second part, wherein the ring shaped chamber has a generally constant diameter.

18. The seat belt retractor of claim 17, wherein the inner diameter of the ring is less than the outer diameter of the first part.

* * * * *